(12) United States Patent
Wu et al.

(10) Patent No.: US 10,782,660 B2
(45) Date of Patent: Sep. 22, 2020

(54) METHOD AND DEVICE FOR SOLVING OPTIMAL POWER FLOW IN POWER SUPPLY SYSTEM, AND STORAGE MEDIUM

(71) Applicant: Tsinghua University, Beijing (CN)

(72) Inventors: Wenchuan Wu, Beijing (CN); Boming Zhang, Beijing (CN); Hongbin Sun, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 390 days.

(21) Appl. No.: 15/853,017

(22) Filed: Dec. 22, 2017

(65) Prior Publication Data

US 2019/0056704 A1    Feb. 21, 2019

(30) Foreign Application Priority Data

Aug. 15, 2017  (CN) .......................... 2017 1 0696169

(51) Int. Cl.
| | |
|---|---|
| H02J 3/18 | (2006.01) |
| G06F 17/10 | (2006.01) |
| G05B 17/02 | (2006.01) |
| H02J 3/12 | (2006.01) |
| H02J 3/16 | (2006.01) |
| G06F 1/26 | (2006.01) |
| G06F 17/11 | (2006.01) |

(52) U.S. Cl.
CPC ............. *G05B 17/02* (2013.01); *G06F 17/10* (2013.01); *H02J 3/12* (2013.01); *H02J 3/16* (2013.01); *H02J 3/18* (2013.01); *G06F 1/266* (2013.01); *G06F 17/11* (2013.01); *H02J 2203/20* (2020.01); *Y02E 40/76* (2013.01)

(58) Field of Classification Search
None
See application file for complete search history.

(56) References Cited

U.S. PATENT DOCUMENTS

| | | | |
|---|---|---|---|
| 2012/0221265 A1* | 8/2012 | Arya ...................... | G01R 29/18 702/61 |
| 2013/0226482 A1* | 8/2013 | Sun ........................... | H02J 3/26 702/60 |
| 2013/0238148 A1* | 9/2013 | Legbedji ................ | G06Q 10/04 700/286 |
| 2015/0377936 A1* | 12/2015 | Ghosh .................. | G01R 21/133 702/60 |
| 2015/0378384 A1* | 12/2015 | Phan ........................ | H02J 3/00 700/287 |
| 2016/0315807 A1* | 10/2016 | Peng ....................... | G06F 1/266 |

* cited by examiner

*Primary Examiner* — Kibrom K Gebresilassie
(74) *Attorney, Agent, or Firm* — Hodgson Russ LLP (57) ABSTRACT

The present disclosure provides a method and a device for solving an optimal power flow in a power supply system. A second convex model of the optimal power flow is established. A relaxation variant sum e according to the second convex model is determined. It is judged whether the relaxation variant sum e is greater than a preset threshold. If the relaxation variant sum e is greater than the preset threshold, the second convex model of the optimal power flow is established. If the relaxation variant sum e is not greater than the preset threshold, the solution of the second convex optimal model is determined as a feasible solution of the optimal model of the optimal power flow.

7 Claims, 2 Drawing Sheets

METHOD AND DEVICE FOR SOLVING OPTIMAL POWER FLOW IN POWER SUPPLY SYSTEM, AND STORAGE MEDIUM

CROSS REFERENCE TO RELATED APPLICATION

This application is based upon and claims a priority to Chinese Patent Application Serial No. 201710696169.9, filed with the State Intellectual Property Office of P. R. China on Aug. 5, 2017, the entire contents of which are incorporated herein by reference.

TECHNICAL FIELD

The present disclosure generally relates to a field of operation and control technology of a power supply system, and more particular to a method and a device for solving an optimal power flow in a power supply system.

BACKGROUND

The optimal power flow means that parameters of various control devices of a power supply system are adjusted in a perspective of optimizing operations of the power supply system. In a case that normal power balance of nodes and various security constraints are satisfied, it realizes to minimize generation cost and network loss. The optimal power flow has a significant application value in operating, dispatching and power grid planning of the power supply system, reliability analysis of a complex power supply system, control of transmission block and the like.

SUMMARY

Embodiments of the present disclosure provide a method for solving an optimal power flow in a power supply system. The method includes: acquiring an active power of a generator connected to each node from the power supply system; determining a target function of an optimal model of the optimal power flow according to the active power of the generator connected to each node; determining a first constraint of the optimal model of the optimal power flow; converting the first constraint into a convex constraint based on convex functions so as to obtain a first convex optimal model, in which the first convex optimal model includes the target function and the first constraint; determining an initial value at iteration k=0, based on the first convex optimal model; at iteration k, performing a linearization to the convex functions, so as to obtain a linear function; establishing a second convex model of the optimal power flow according to the linear function, and setting a second constraint to the second convex model; determining a relaxation variant sum e according to the second convex model; and judging whether the relaxation variant sum e is greater than a preset threshold; if the relaxation variant sum e is greater than the preset threshold, adding the iteration value k by 1, and returning an act of performing the linearization to the convex functions, so as to obtain the linear function; and if the relaxation variant sum e is not greater than the preset threshold, stopping determining the optimal power flow of the power supply system.

Embodiments of the present disclosure provide a control device, including a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store a executable program code; and the processor, by reading the executable program code stored in the memory, is configured to run a program corresponding to executable the program code, so as to perform the above method.

Embodiments of the present disclosure provide a storage medium, configured to store an application for performing the above method.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

In the description, it is to be understood that, terms such as "first" and "second" are used herein for purposes of description and are not intended to indicate or imply relative importance or significance. In the description of the present disclosure, it is to be illustrated that, unless specified or limited otherwise, terms "interconnected," and "connected," are understood broadly, such as fixed, detached or integral interconnections and connections, also can be mechanical or electrical interconnections and connections, further can be direct interconnections and connections and indirect interconnections and connections via intermediate medium. For those skilled in the art, it can be understood the concrete meaning of the terms mentioned above in the present disclosure according to specific circumstances. Furthermore, in the description of the present disclosure, unless illustrated otherwise, "a plurality of" means two or more than two.

Any procedure or method described in the flow charts or described in any other way herein may be understood to comprise one or more models, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

In a problem of an optimal power flow of a power supply system, due to a non-convex constraint introduced by a quadratic term in a power flow equation, the problem of the optimal power flow of the power supply system becomes non-convex, which is difficult to be solved. For a distribution network and a transmission network including a loop path, a second order cone relaxation method is adopted, to convert the problem of the optimal power flow of the power supply system into a convex optimization problem. A solution of the convex optimization problem is not a feasible solution of the problem of the non-convex optimal power flow of the power supply system, which has no physical meanings and cannot be applied to a dispatching decision of the power supply system. Therefore, a method in the related art for solving the optimal power flow of the power supply system having the loop path is non-convex, such as Newton-Laphson method or Interior Point Method. With these non-convex optimization methods, optimizations of calculation efficiency and calculation results cannot guaranteed, which is unable to be applied to distribution optimization and uncertainty optimization of the power supply system. Up to now, a convex optimization method for obtaining a feasible solution in the problem of the optimal power flow of the power supply system including the loop path is desired.

Therefore, embodiments of the present disclose a method for solving an optimal power flow in a power supply system (i.e. a convex optimization determination method of an optimal power flow in a power supply system), to overcome disadvantages in the related arts. On the basis of a non-convex model of the optimal power flow of the power supply system, non-convex constraints are converted to a subtractive form of convex functions. By performing convex function linearization in the non-convex constraints and introducing relaxation variants, the problem of the non-convex optimal power flow is converted to the convex optimization problem, which realizes a high efficient solution method of the problem of the optimal power flow of the power supply system.

There are advantages of the convex optimization determination method provided in embodiments of the present disclosure.

1. On the basis of the non-convex optimal power flow model of the power supply system, the non-convex constraints of the power flow equation of the power supply system are converted to the subtractive form of the convex functions. The problem of the non-convex optimal power flow is converted to an iteration problem of the convex optimization problem, which may realize to solve the problem of the optimal power flow of the power supply system high-efficiently.

2. By converting the non-convex constraints of the power flow equation of the power supply system to the subtractive form of the convex functions, for distribution optimization and uncertainty optimization of the power supply system, it requires that constraints of models must to be combined with convex function problems, which has a wide application space.

3. With the convex optimization determination method provided in the present disclosure, the feasible solution of the problem of the optimal power flow of the power supply system may be solved according to the iteration of the convex problems. Parameters of various control devices obtained may be directly applied to operation dispatching of the power supply system, instead of adopting Newton-Laphson method or Interior Point Method, thereby improving efficiency of operating and dispatching of the power supply system.

Figure 1:
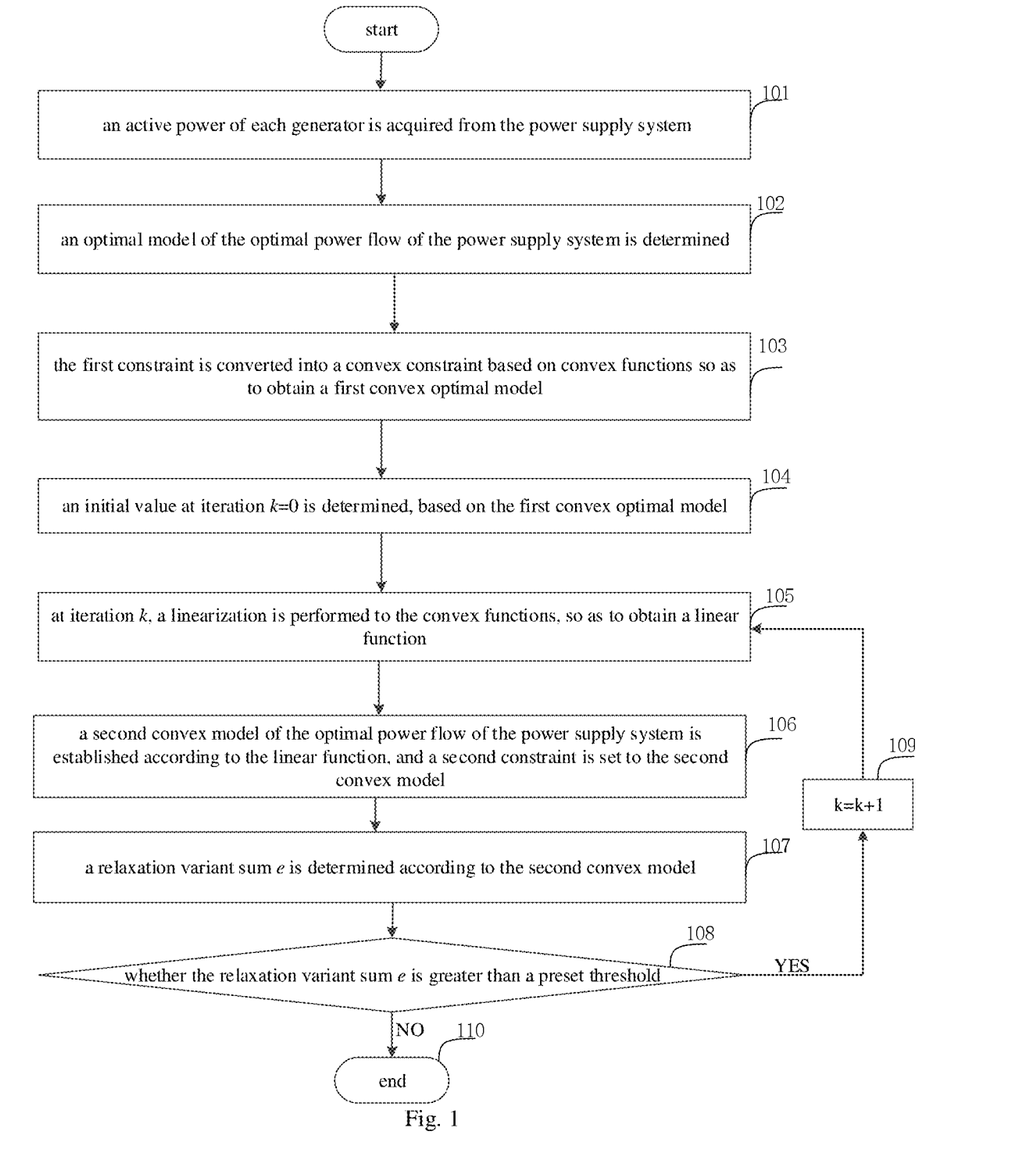
FIG. 1 is a flow chart illustrating a method for solving an optimal power flow in a power supply system according to an embodiment of the present disclosure.

As illustrated in FIG. 1, FIG. 1 is a flow chart illustrating a convex optimization determination method of an optimal power flow in a power supply system according to an embodiment of the present disclosure. The method provided by the present disclosure includes the followings.

At block 101, an active power of each generator is acquired from the power supply system.

The active power of each generator may be obtained from the control device via the communication network.

At block 102, an optimal model of the optimal power flow of the power supply system is determined. The optimal model of the optimal power flow of the power supply system includes a target function and a first constraint.

In an embodiment, the target function is set to the optimal model of the optimal power flow of the power supply system.

The target function is denoted by a formula of:

$$\min \Sigma C_i(p_i^g) \qquad (1)$$

where, i denotes a node in the power supply system, g denotes a generator in the power supply system; $p_i^g$ denotes an active power of the generator g connected with the node i; $C_i(p_i^g)$ denotes a convex function including a variant $p_i^g$, and denotes a generation cost of the generator g connected with the node i.

In an embodiment, the first constraint includes: at least one of a branch power flow constraint of the power supply system, a node injection power balance constraint of the power supply system, a generator power constraint of the power supply system, a branch phase angle difference constraint of the power supply system, a branch power constraint of the power supply system and a node voltage amplitude constraint of the power supply system.

In an embodiment, the branch power flow constraint of the power supply system is denoted by formulas of:

$$p_{ij} = G_{ij}V_i^2 - G_{ij}V_iV_j \cos\theta_{ij} - B_{ij}V_iV_j \sin\theta_{ij} \qquad (2)$$

$$q_{ij} = -B_{ij}V_i^2 + B_{ij}V_iV_j \cos\theta_{ij} - G_{ij}V_iV_j \sin\theta_{ij} \qquad (3)$$

$$\theta_{ij} = \theta_i - \theta_j \qquad (4)$$

where, i and j denote different nodes in the power supply system respectively, and the node i is adjacent to the node j; ij denotes a branch between the node i and the node j; $p_{ij}$ denotes a three-phase active power at a head of the branch ij in the power supply system; $q_{ij}$ denote a three-phase reactive power at the head of the branch ij in the power supply system; $V_i$ denotes a voltage amplitude of the node i of the power supply system; $V_j$ denotes a voltage amplitude of the node j of the power supply system; $\theta_i$ denotes a voltage phase angle of the node i of the power supply system; $\theta_j$ denotes a voltage phase angle of the node j of the power supply system; $\theta_{ij}$ denotes a difference between a voltage phase angle at the head of the branch ij and a voltage phase angle at the end of the branch ij in the power supply system; $G_{ij}$ denotes a conductance of the branch ij in the power supply system; and $B_{ij}$ denotes a susceptance of the branch ij in the power supply system.

In an embodiment, the node injection power balance constraint of the power supply system is denoted by formulas of:

$$p_i^g - p_i^d = G_{sh,i} V_i^2 + \sum_{j \in \Phi(i)} p_{ij} \quad (5)$$

$$q_i^g - q_i^d = -B_{sh,i} V_i^2 + \sum_{j \in \Phi(i)} q_{ij} \quad (6)$$

where, d denotes a load in the power supply system; sh denotes ground connection; $p_i^g$ denotes an active power of the generator g connected with the node i in the power supply system; $q_i^g$ denotes a reactive power of the generator g connected with the node i in the power supply system; $p_i^d$ denotes an active power of the load d connected with the node i in the power supply system; $q_i^d$ denotes a reactive power of the load d connected with the node i in the power supply system; $G_{sh,i}$ denotes a ground connection conductance of the node i in the power supply system; $B_{sh,i}$ denotes a ground connection susceptance of the node i in the power supply system; and $\Phi(i)$ denotes a node set consisted of nodes connected with the node i in the power supply system.

In an embodiment, the generator power constraint of the power supply system is denoted by formulas of:

$$p_i^l \le p_i^g \le p_i^u \quad (7)$$

$$q_i^l \le q_i^g \le q_i^u \quad (8)$$

where, u denotes a upper limitation, l denotes a lower limitation; $p_i^l$, denotes a lower limitation of an active power of the generator g connected with the node i in the power supply system; $p_i^u$ denotes a upper limitation of an active power of the generator g connected with the node i in the power supply system; $q_i^l$ denotes a lower limitation of a reactive power of the generator g connected with the node i in the power supply system; $q_i^u$ denotes a upper limitation of a reactive power of the generator g connected with the node i in the power supply system.

In an embodiment, the branch phase angle difference constraint of the power supply system is denoted by a formula of:

$$-\theta^u \le \theta_{ij} \le \theta^u \quad (9)$$

where, $\theta^u$ denotes a upper limitation of the difference between the voltage phase angle at the head of the branch ij and the voltage phase angle at the end of the branch ij in the power supply system. For example, $\theta^u$ equals to 10°.

In an embodiment, the branch power constraint of the power supply system is denoted by a formula of:

$$p_{ij}^2 + q_{ij}^2 \le (S^u)^2 \quad (10)$$

where, $S^u$ denotes a upper limitation of an apparent power of respective branch in the power supply system.

In an embodiment, the upper limitation of the apparent power is determined according to a standard of security running of the power supply system, and generally associated with versions of respective branches.

In an embodiment, the node voltage amplitude constraint of the power supply system is denoted by a formula of:

$$V^l \le V_i \le V^u \quad (11)$$

where, $V^l$ denotes a lower limitation of the voltage amplitude of respective node in the power supply system; $V^u$ denotes a upper limitation of the voltage amplitude of respective node in the power supply system.

In an embodiment, $V^u$ ranges from 1.05 p.u. to 1.1 p.u., $V^l$ ranges from 0.9 p.u. to 0.95 p.u., where p.u. is per unit of the power supply system.

At block 103, the first constraint is converted into a convex constraint based on convex functions so as to obtain a first convex optimal model. The first convex optimal model includes the target function and the first constraint.

In an embodiment, it is introduced a parameter $K_{ij}$ to place $V_{ij} \cos \theta_{ij}$, a parameter $L_{ij}$ to place $V_i V_j \sin \theta_{ij}$, a parameter $U_i$ to place $V_i^2$, a parameter $s_{ij}$ to place $\sin \theta_{ij}$, and a parameter $c_{ij}$ to place $\cos \theta_{ij}$, so as to convert the formulas (2) and (3) equivalently into the following formulas of:

$$p_{ij} = G_{ij} U_i - G_{ij} K_{ij} - B_{ij} L_{ij} \quad (12)$$

$$q_{ij} = B_{ij} U_i + B_{ij} K_{ij} - G_{ij} L_{ij} \quad (13)$$

$$K_{ij}^2 + L_{ij}^2 = U_i U_j \quad (14)$$

$$s_{ij} = \sin \theta_{ij} \quad (15)$$

$$c_{ij} = \cos \theta_{ij} \quad (16)$$

$$s_{ij}^2 + c_{ij}^2 = 1 \quad (17)$$

$$s_{ij} K_{ij} = c_{ij} L_{ij} \quad (18)$$

In an embodiment, the convex functions $f_{ij,1}(x)$, $f_{ij,2}(x)$, $f_{ij,3}(x)$, $g_{ij,1}(x)$, $g_{ij,2}(x)$ and $g_{ij,3}(x)$ satisfying following formulas:

$$f_{ij,1}(x) = (U_i + U_j)^2 \quad (19)$$

$$f_{ij,2}(x) = 1 \quad (20)$$

$$f_{ij,3}(x) = (s_{ij} + K_{ij})^2 + (c_{ij} - L_{ij})^2 \quad (21)$$

$$g_{ij,1}(x) = (2K_{ij})^2 + (2L_{ij})^2 + (U_i - U_j)^2 \quad (22)$$

$$g_{ij,2}(x) = s_{ij}^2 + c_{ij}^2 \quad (23)$$

$$g_{ij,3}(x) = (s_{ij} - K_{ij})^2 + (C_{ij} + L_{ij})^2 \quad (24)$$

where, x denotes a vector of the power system consisted of the parameter $U_i$ of all nodes and all parameters $s_{ij}$, $c_{ij}$, $K_{ij}$ and $L_{ij}$ of all branches in the power supply system.

In an embodiment, based on the convex functions, it is converted the formulas (13), (15) and (16) into the following formulas of:

$$g_{ij,n}(x) - f_{ij,n}(x) \le 0, n=1,2 \quad (25)$$

$$g_{ij,3}(x) - f_{ij,3}(x) \le 0 \quad (26)$$

$$f_{ij,m}(x) - g_{ij,m}(x) \le 0, m=1,2,3 \quad (27)$$

As the difference between a voltage phase angle at the head of the branch ij and a voltage phase angle at the end of the branch ij in the power supply system is generally smaller than 10°, the constraint $s_{ij} = \sin \theta_{ij}$ is further converted to:

$$s_{ij} = \theta_{ij} \quad (28)$$

A non-convex optimal model of the optimal power flow of the power supply system may be as follows.

The target function of the non-convex optimal model is denoted as a formula of:

$$\min \Sigma C_i(p_i^g) \quad (29)$$

In an embodiment, the constraint of the non-convex optimal model includes: the formulas (4) to (11), the formulas (12) and (13) and the formulas (25) to (28).

The above optimal model of the optimal power flow is a non-convex optimal model. The formula (26) and the formula (27) are non-convex constraints, while other constraints are convex constraints.

The non-convex optimal model of the optimal power flow of the power supply system may be converted into a first convex optimal model.

The target function of the first convex optimal model is denoted by a formula of:

$$\min \Sigma C_i(p_i^g) \qquad (30)$$

The constraint of the first convex optimal model includes: the formulas (4) to (11), the formulas (12) and (13) and the formulas (25).

The non-convex optimal mode of the optimal power flow of the power supply system is performed with a convex optimization solution.

At block 104, an initial value at iteration k=0 is determined, based on the first convex optimal model.

An initial value $\tau^{(0)}$, a maximum value $\tau^{max}$ and a growth rate μ of a penalty function τ are set.

A solution of the first convex optimal model is calculated. The solution of the first convex optimal model is assigned to an initial value $x^{(0)}$ of the vector x of the power system.

At block 105, at iteration k, a linearization is performed to the convex functions, so as to obtain a linear function.

In an embodiment, at $x^{(k)}$, the convex functions is performed with the linearization to obtain the linear functions. The linear function is denoted as formulas of:

$$\hat{g}_{ij,m}(x,x^{(k)})=g_{ij,m}(x^{(k)})-\nabla g_{ij,m}(x^{(k)})^T(x-x^{(k)}), m=1,2,3 \qquad (31)$$

$$\hat{f}_{ij,3}(x,x^{(k)})=f_{ij,3}(x^{(k)})-\nabla f_{ij,3}(x^{(k)})^T(x-x^{(k)}) \qquad (32)$$

where, k denotes an iteration value.

At block 106, a second convex model of the optimal power flow of the power supply system is established according to the linear function, and a second constraint is set to the second convex model.

A target function and a second constraint are determined for the second convex model of the optimal power flow of the power supply system.

The target function of the second convex model is denoted by a formula of:

$$\min \sum C_i(p_i^g) + \tau^{(k)} \sum_{ij \in \Phi_i} \left( \sum_{m=1}^{3} \varepsilon_{ij,m}^{(k)} + \varepsilon_{ij,4}^{(k)} \right) \qquad (33)$$

The second constraint of the second convex model includes:

$$f_{ij,m}(x)-\hat{g}_{ij,m}(x,x^{(k)}) \leq \varepsilon_{ij,m}^{(k)}, m=1,2,3 \qquad (34)$$

$$g_{ij,3}(x)-\hat{f}_{ij,3}(x,x^{(k)}) \leq \varepsilon_{ij,4}^{(k)} \qquad (35)$$

$$\varepsilon_{ij,m}^{(k)} \geq 0, m=1,\ldots,3 \qquad (36)$$

$$\varepsilon_{ij,4}^{(k)} \geq 0 \qquad (37),$$

where $\varepsilon_{ij,m}^{(k)}$, m=1, 2, 3 denotes a first relaxation variant, a second relaxation variant and a third relaxation variant of the branch ij in the power supply system at k iteration, and $\varepsilon_{ij,4}^{(k)}$ denotes a fourth relaxation variant of the branch ij in the power supply system at k iteration; $\Phi_l$ denotes a set of all branches in the power supply system.

The second constraint of the second convex model further includes the formulas (4), (5), (6), (7), (8), (9), (10), (11), (12), (13), (25), (28).

By adding the relaxation variants in the formulas (34) and (35), it ensures that the convex optimal model of the optimal power flow of the power supply system is solvable.

At block 107, a relaxation variant sum e is determined according to the second convex model.

The second convex model of the optimal power flow of the power supply system is calculated, so as to obtain a solution of the second convex model; and the relaxation variant sum e is calculated according to the solution of the second convex model.

The relaxation variant sum e is denoted by a formula of:

$$e = \sum_{ij \in \Phi_i} \left( \sum_{m=1}^{3} \varepsilon_{ij,m}^{(k)} + \varepsilon_{ij,4}^{(k)} \right) \qquad (38)$$

At block 108, it is judged whether the relaxation variant sum e is greater than a preset threshold.

The preset threshold ε may be set in advance to compare the relaxation variant sum e and the preset threshold ε.

At block 109, if the relaxation variant sum e is greater than the preset threshold, the iteration value k is added by 1, and an act of performing the linearization to the convex functions, so as to obtain the linear function is returned (i.e. the block 105 is returned).

The iteration value k is added by 1, the solution of the optimal model is assigned to the vector $x^{(k+1)}$ of the power supply system, and the penalty function $\tau^{(k+1)}$ is set as a smaller one of $\mu\tau^{(k)}$ and $\tau_{max}$. The iteration value is set as k=k+1, and the act of performing the linearization to the convex functions, so as to obtain the linear function is returned, so as to obtain the linear function, where μ is the growth rate of the penalization function τ.

At block 110, if the relaxation variant sum e is not greater than the preset threshold, it stops determining the optimal power flow of the power supply system.

The solution of the second convex optimal model of the optimal power flow of the power supply system is determined as a feasible solution of the optimal model of the optimal power flow of the power supply system.

Figure 2:
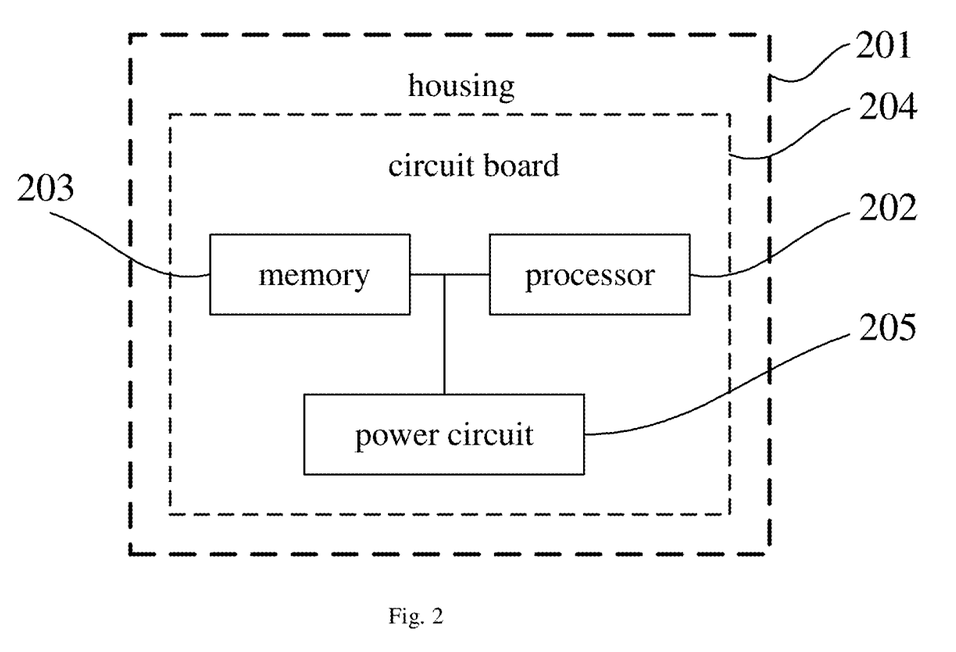
FIG. 2 is a block diagram illustrating a device for solving an optimal power flow in a power supply system according to embodiments of the present disclosure.

As illustrated in FIG. 2, the device 200 includes a housing 201, a processor 202, a memory 203, a circuit board 204 and a power circuit 205. The circuit board 204 is arranged inside a space enclosed by the housing 201; the processor 202 and the memory 203 are disposed on the circuit board 204; the power circuit 205 is configured to provide power for individual circuit or component; the memory 203 is configured to store a executable program code; and the processor 202, by reading the executable program code stored in the memory, is configured to run a program corresponding to executable the program code, so as to perform the convex optimization determination method according to method embodiments mentioned above.

It is to be illustrated that, description and explanation of the control device according to embodiments of the present disclosure may be understood with reference to the method embodiments, which is not elaborated herein.

Embodiments of the present disclosure further provide a storage medium. The storage medium is configured to store applications for perform the convex optimization determination method according to method embodiments mentioned above.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing model, or these cells may be separate physical existence, or two or more cells are integrated in a processing model. The integrated model may be realized in a form of hardware or in a form of software function models. When the integrated model is realized in a form of software function model and is sold or used as a standalone product, the integrated model may be stored in a computer readable storage medium.

The storage medium mentioned above may be read-only memories, magnetic disks or CD, etc.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for solving an optimal power flow in a power supply system, performed by one or more computing devices and comprising:

acquiring, by the one or more computing devices, an active power of a generator connected to each node from various control devices of the power supply system;

determining, by the one or more computing devices, a target function of an optimal model of the optimal power flow according to the active power of the generator connected to each node, wherein the target function is denoted by a formula of min $\Sigma C_i(p_i^g)$ (1)

where, i denotes a node in the power supply system, g denotes a generator in the power supply system, $p_i^g$ denotes an active power of the generator g connected with the node I, $C_i(p_i^g)$ is a convex function having a variant $p_i^g$ and denotes a generation cost of the generator g connected with the node i;

determining, by the one or more computing devices, a first constraint of the optimal model of the optimal power flow, wherein the first constraint comprises at least one of: a branch power flow constraint of the power supply system, a node injection power balance constraint of the power supply system, a generator power constraint of the power supply system, a branch phase angle difference constraint of the power supply system, a branch power constraint of the power supply system and a node voltage amplitude constraint of the power supply system, in which, the branch power flow constraint is denoted by formulas of: $p_{ij}=G_{ij}V_i^2-G_{ij}V_iV_j \cos \theta_{ij}-B_{ij}V_iV_j \sin \theta_{ij}$ (2), $q_{ij}=-B_{ij}V_i^2+B_{ij}V_iV_j \cos \theta_{ij}-G_{ij}V_iV_j \sin \theta_{ij}$ (3), and $\theta_{ij}=\theta_i-\theta_j$ (4), where, i and j denote adjacent nodes in the power supply system; $p_{ij}$ denotes a three-phase active power at a head of a branch ij in the power supply system; $q_{ij}$ denote a three-phase reactive power at the head of the branch ij; $V_i$ denotes a voltage amplitude of the node i; $V_j$ denotes a voltage amplitude of the node j; $\theta_i$ denotes a voltage phase angle of the node i; $\theta_j$ denotes a voltage phase angle of the node j; $\theta_{ij}$ denotes a difference between a voltage phase angle at the head of the branch and a voltage phase angle at the end of the branch ij; $G_{ij}$ denotes a conductance of the branch ij; and $B_{ij}$ denotes a susceptance of the branch ij;

the node injection power balance constraint is denoted by formulas of:

$$p_i^g - p_i^d = G_{sh,i}V_i^2 + \sum_{j \in \Phi(i)} p_{ij} \text{ and} \qquad (5)$$

-continued $$q_i^g - q_i^d = -B_{sh,i}V_i^2 + \sum_{j\in\Phi(i)} q_{ij},\quad (6)$$

where, g denotes a generator in the power supply system; d denotes a load in the power supply system; sh denotes ground connection; $p_i^g$ denotes an active power of the generator g connected with the node i; $q_i^g$ denotes a reactive power of the generator g connected with the node i; $p_i^d$ denotes an active power of the load d connected with the node i; $q_i^d$ denotes a reactive power of the load d connected with the node i; $G_{sh,i}$ denotes a ground connection conductance of the node i; $B_{sh,i}$ denotes a ground connection susceptance of the node i; and $\Phi(i)$ denotes a node set consisted of nodes connected with the node i;

the generator power constraint is denoted by formulas of: $p_i^l \leq p_i^g \leq p_i^u$ (7) and $q_i^l \leq q_i^g \leq q_i^u$ (8), where, u denotes a upper limitation, l denotes a lower limitation; $p_i^l$ denotes a lower limitation of an active power of the generator g connected with the node i; $p_i^u$ denotes a upper limitation of an active power of the generator g connected with the node i; $q_i^l$ denotes a lower limitation of a reactive power of the generator g connected with the node i; $q_i^u$ denotes a upper limitation of a reactive power of the generator g connected with the node i;

the branch phase angle difference constraint is denoted by a formula of: $-\theta^u \leq \theta_{ij} \leq \theta^u$ (9), where, $\theta^u$ denotes a upper limitation of the difference between the voltage phase angle at the head of the branch ij and the voltage phase angle at the end of the branch ij;

the branch power constraint is denoted by a formula of: $p_{ij}^2 + q_{ij}^2 \leq (S^u)^2$ (10), where, $S^u$ denotes a upper limitation of an apparent power of respective branch in the power supply system;

the node voltage amplitude constraint is denoted by a formula of: $V^l \leq V_i \leq V^u$ (11), where, $V^l$ denotes a lower limitation of the voltage amplitude of respective node in the power supply system; $V^u$ denotes a upper limitation of the voltage amplitude of respective node in the power supply system;

converting, by the one or more computing devices, the first constraint into a convex constraint based on convex functions so as to obtain a first convex optimal model, wherein the first convex optimal model comprises the target function and the first constraint, wherein the converting comprises: introducing a parameter $K_{ij}$ to place $V_iV_j\cos\theta_{ij}$, a parameter $L_{ij}$ to $V_iV_j\sin\theta_{ij}$, a parameter $U_i$ to place $V_i^2$, a parameter $s_{ij}$ to place $\sin\theta_{ij}$, and a parameter $c_{ij}$ to place $\cos\theta_{ij}$, to convert the branch power flow constraint into the following formulas of: $p_{ij}=G_{ij}U_i-G_{ij}K_{ij}-B_{ij}L_{ij}$ (12), $q_{ij}=B_{ij}U_i+B_{ij}K_{ij}-G_{ij}L_{ij}$ (13), $K_{ij}^2+L_{ij}^2=U_iU_j$ (14), $s_{ij}=\sin\theta_{ij}$ (15), $c_{ij}=\cos\theta_{ij}$ (16), $s_{ij}^2+c_{ij}^2=1$ (17), $s_{ij}K_{ij}=c_{ij}L_{ij}$ (18); defining the convex functions $f_{ij,1}(x)$, $f_{ij,2}(x)$, $f_{ij,3}(x)$, $g_{ij,1}(x)$, $g_{ij,2}(x)$ and $g_{ij,3}(x)$, wherein the convex functions are denoted by formulas of: $f_{ij,1}(x)=(U_i+U_j)^2$ (19), $f_{ij,2}(x)=1$ (20), $f_{ij,3}(x)=(s_{ij}+K_{ij})^2+(c_{ij}-L_{ij})^2$ (21), $g_{ij,1}(x)=(2K_{ij})^2+(2L_{ij})^2+(U_i-U_j)^2$ (22), $g_{ij,2}(x)=s_{ij}^2+c_{ij}^2$ (23), $g_{ij,3}(x)=(s_{ij}-K_{ij})^2+(C_{ij}+L_{ij})^2$ (24), where, x denotes a vector consisted of the parameter $U_i$ of all nodes and all parameters $s_{ij}$, $c_{ij}$, $K_{ij}$ and $L_{ij}$ of all branches in the power supply system; based on the convex functions; converting the formulas (13), (15) and (16) into the following formulas of: $g_{ij,n}(x)-f_{ij,n}(x)\leq 0$, n=1, 2 (25), $g_{ij,3}(x)-f_{ij,3}(x)\leq 0$ (26), $f_{ij,m}(x)-g_{ij,m}(x)\leq 0$, m=1, 2, 3 (27), and $s_{ij}=\theta_{ij}$ (28), the convex constraint comprises: the formulas (4), (5), (6), (7), (8), (9), (10), (11), (12), (13) and (25);

determining, by the one or more computing devices, an initial value at iteration k=0, based on the first convex optimal model;

at iteration k, performing, by the one or more computing devices, a linearization to the convex functions, so as to obtain a linear function, wherein the linear function is denoted as formulas of: $\hat{g}_{ij,m}(x,x^{(k)})=g_{ij,m}(x^{(k)})-\nabla g_{ij,m}(x^{(k)})^T(x-x^{(k)})$, m=1, 2, 3 (31) and $\hat{f}_{ij,3}(x,x^{(k)})=f_{ij,3}(x^{(k)})-\nabla f_{ij,3}(x^{(k)})^T(x-x^{(k)})$ (32), where, k denotes an iteration value;

establishing, by the one or more computing devices, a second convex model of the optimal power flow according to the linear function, and setting, by the one or more computing devices, a second constraint to the second convex model, wherein a target function of the second convex model is denoted by a formula of:

$$\min \sum C_i(p_i^g) + \tau^{(k)}\sum_{ij\in\Phi_l}\left(\sum_{m=1}^3 \varepsilon_{ij,m}^{(k)} + \varepsilon_{ij,4}^{(k)}\right),\quad (33)$$

a second constraint of the second convex model comprises the formulas (4), (5), (6), (7), (8), (9), (10), (11), (12), (13), (25), (28) and formulas of: $f_{ij,m}(x)-\hat{g}_{ij,m}(x,x^{(k)})\leq \varepsilon_{ij,m}^{(k)}$, m=1, 2, 3 (34), $g_{ij,3}(x)-\hat{f}_{ij,3}(x,x^{(k)})\leq \varepsilon_{ij,4}^{(k)}$ (35), $\varepsilon_{ij,m}^{(k)}\geq 0$, m=1, ..., 3 (36), $\varepsilon_{ij,4}^{(k)}\geq 0$ (37), where $\varepsilon_{ij,m}^{(k)}$, m=1, 2, 3 denotes a first relaxation variant, a second relaxation variant and a third relaxation variant of the branch ij at k iteration, and $\varepsilon_{ij,4}^{(k)}$ denotes a fourth relaxation variant of the branch ij at k iteration; $\Phi_l$ denotes a set of all branches in the power supply system;

determining, by the one or more computing devices, a relaxation variant sum e according to the second convex model; and judging, by the one or more computing devices, whether the relaxation variant sum e is greater than a preset threshold;

if the relaxation variant sum e is greater than the preset threshold, adding the iteration value k by 1, and returning an act of performing the linearization to the convex functions, so as to obtain the linear function; and if the relaxation variant sum e is not greater than the preset threshold, determining a solution of the second convex optimal model of the optimal power flow of the power supply system as a feasible solution of the optimal model of the optimal power flow of the power supply system to obtain parameters of various control devices, and applying the parameters of various control devices to operation dispatching of the power supply system.

2. The method according to claim 1, wherein determining an initial value at iteration k=0, based on the first convex optimal model comprises:

setting an initial value $\tau^{(0)}$, a maximum value $\tau^{max}$ and a growth rate $\mu$ of a penalty function $\tau$;

calculating a solution of the first convex optimal model of the optimal power flow;

assigning the solution of the first convex optimal model to an initial value $x^{(0)}$ of the vector x of the power system.

3. The method according to claim 1, wherein determining a relaxation variant sum e according to the second convex model comprises:

calculating the second convex model of the optimal power flow of the power supply system, so as to obtain a solution of the second convex model;

calculating the relaxation variant sum e according to the solution of the second convex model;

wherein the relaxation variant sum e is denoted by a formula of:

$$e = \sum_{ij \in \Phi_i} \left( \sum_{m=1}^{3} \varepsilon_{ij,m}^{(k)} + \varepsilon_{ij,A}^{(k)} \right). \quad (38)$$

4. The method according to claim 3, wherein if the relaxation variant sum e is greater than the preset threshold, adding the iteration value k by 1, and returning an act of performing the linearization to the convex functions, so as to obtain the linear function comprises:

adding the iteration value k by 1, assigning the solution of the second convex optimal model of the optimal power flow of the power supply system to the vector $x^{(k+1)}$ of the power supply system;

setting the penalty function $\tau^{(k+1)}$ as a smaller one of $\mu\tau^{(k)}$ and $\tau^{max}$;

setting the iteration value as k=k+1, and returning to the act of performing the linearization to the convex functions, so as to obtain the linear function, where μ is the growth rate of the penalty function τ.

5. The method according to claim 3, wherein if the relaxation variant sum e is not greater than the preset threshold, stopping determining the optimal power flow of the power supply system comprises:

determining the solution of the second convex optimal model of the optimal power flow of the power supply system as a feasible solution of the optimal model of the optimal power flow of the power supply system.

6. A device for solving an optimal power flow in a power supply system, comprising a housing, a processor, a memory, a circuit board and a power circuit, the circuit board is arranged inside a space enclosed by the housing; the processor and the memory are disposed on the circuit board; the power circuit is configured to provide power for individual circuit or component; the memory is configured to store a executable program code; and the processor, by reading the executable program code stored in the memory, is configured to run a program corresponding to executable the program code, so as to perform the followings:

acquiring an active power of a generator connected to each node from various control devices of the power supply system;

determining a target function of an optimal model of the optimal power flow according to the active power of the generator connected to each node, wherein the target function is denoted by a formula of min $\Sigma C_i(p_i^g)$ (1)

where, i denotes a node in the power supply system, g denotes a generator in the power supply system, $p_i^g$ denotes an active power of the generator g connected with the node I, $C_i(p_i^g)$ is a convex function having a variant $p_i^g$ and denotes a generation cost of the generator g connected with the node i;

determining a first constraint of the optimal model of the optimal power flow wherein the first constraint comprises at least one of: a branch power flow constraint of the power supply system, a node injection power balance constraint of the power supply system, a generator power constraint of the power supply system, a branch phase angle difference constraint of the power supply system, a branch power constraint of the power supply system and a node voltage amplitude constraint of the power supply system, in which, the branch power flow constraint is denoted by formulas of: $p_{ij}=G_{ij}V_i^2-G_{ij}V_iV_j \cos \theta_{ij}-B_{ij}V_iV_j \sin \theta_{ij}$ (2), $q_{ij}=-B_{ij}V_i^2+B_{ij}V_iV_j \cos \theta_{ij}-G_{ij}V_iV_j \sin \theta_{ij}$ (3), and $\theta_{ij}=\theta_i-\theta_j$ (4), where, i and j denote adjacent nodes in the power supply system; $p_{ij}$ denotes a three-phase active power at a head of a branch ij in the power supply system; $q_{ij}$ denote a three-phase reactive power at the head of the branch ij; $V_i$ denotes a voltage amplitude of the node i; $V_j$ denotes a voltage amplitude of the node j; $\theta_i$ denotes a voltage phase angle of the node i; $\theta_j$ denotes a voltage phase angle of the node j; $\theta_{ij}$ denotes a difference between a voltage phase angle at the head of the branch ij and a voltage phase angle at the end of the branch ij; $G_{ij}$ denotes a conductance of the branch ij; and $B_{ij}$ denotes a susceptance of the branch ij;

the node injection power balance constraint is denoted by formulas of:

$$p_i^g - p_i^d = G_{sh,i}V_i^2 + \sum_{j \in \Phi(i)} p_{ij} \text{ and} \quad (5)$$

$$q_i^g - q_i^d = -B_{sh,i}V_i^2 + \sum_{j \in \Phi(i)} q_{ij}, \quad (6)$$

where, g denotes a generator in the power supply system; d denotes a load in the power supply system; sh denotes ground connection; $p_i^g$ denotes an active power of the generator g connected with the node i; $q_i^g$ denotes a reactive power of the generator g connected with the node i; $p_i^d$ denotes an active power of the load d connected with the node i; $q_i^d$ denotes a reactive power of the load d connected with the node i; $G_{sh,i}$ denotes a ground connection conductance of the node i; $G_{sh,i}$ denotes a ground connection susceptance of the node i; and Φ(i) denotes a node set consisted of nodes connected with the node i;

the generator power constraint is denoted by formulas of: $p_i^l \leq p_i^g \leq p_i^u$ (7) and $q_i^l \leq q_i^g \leq q_i^u$ (8), where, u denotes a upper limitation, l denotes a lower limitation; $p_i^l$ denotes a lower limitation of an active power of the generator g connected with the node i; $p_i^u$ denotes a upper limitation of an active power of the generator g connected with the node i; $q_i^l$ denotes a lower limitation of a reactive power of the generator g connected with the node i; $q_i^u$ denotes a upper limitation of a reactive power of the generator g connected with the node i;

the branch phase angle difference constraint is denoted by a formula of: $-\theta^u \leq \theta_{ij} \leq \theta^u$ (9), where, $\theta^u$ denotes a upper limitation of the difference between the voltage phase angle at the head of the branch ij and the voltage phase angle at the end of the branch ij;

the branch power constraint is denoted by a formula of: $p_{ij}^2+q_{ij}^2 \leq (S^u)^2$ (10), where, $S^u$ denotes a upper limitation of an apparent power of respective branch in the power supply system;

the node voltage amplitude constraint is denoted by a formula of: $V^l \leq V_i \leq V^u$ (11), where, $V^l$ denotes a lower limitation of the voltage amplitude of respective node in the power supply system; $V^H$ denotes a upper limitation of the voltage amplitude of respective node in the power supply system;

converting the first constraint into a convex constraint based on convex functions so as to obtain a first convex optimal model, wherein the first convex optimal model comprises the target function and the first constraint, wherein the converting comprises: introducing a parameter $K_{ij}$ to place $V_i V_j \cos \theta_{ij}$, a parameter $L_{ij}$ to $V_i V_j \sin \theta_{ij}$, a parameter $U_i$ to place $V_i^2$, a parameter $s_{ij}$ to place $\sin \theta_{ij}$, and a parameter $c_{ij}$ to place $\cos \theta_{ij}$, to convert the branch power flow constraint into the following formulas of: $p_{ij}=G_{ij}U_i-G_{ij}K_{ij}-B_{ij}L_{ij}$ (12), $q_{ij}=B_{ij}U_i+B_{ij}K_{ij}-G_{ij}L_{ij}$ (13), $K_{ij}^2+L_{ij}^2=U_iU_j$ (14), $s_{ij}=\sin\theta_{ij}$ (15), $c_{ij}=\cos\theta_{ij}$ (16), $s_{ij}^2+c_{ij}^2=1$ (17) and $s_{ij}K_{ij}=c_{ij}L_{ij}$ (18); defining the convex functions $f_{ij,1}(x)$, $f_{ij,2}(x)$, $f_{ij,3}(x)$, $g_{ij,1}(x)$, $g_{ij,2}(x)$ and $g_{ij,3}(x)$, wherein the convex functions are denoted by formulas of: $f_{ij,1}(x)=(U_i+U_j)^2$ (19), $f_{ij,2}(x)=1$ (20), $f_{ij,3}(x)=(s_{ij}+K_{ij})^2+(c_{ij}-L_{ij})^2$ (21), $g_{ij,1}(x)=(2K_{ij})^2+(2L_{ij})^2+(U_i-U_j)^2$ (22), $g_{ij,2}(x)=s_{ij}^2+c_{ij}^2$ (23), $g_{ij,3}(x)=(s_{ij}-K_{ij})^2+(C_{ij}+L_{ij})^2$ (24), where, x denotes a vector consisted of the parameter $U_i$ of all nodes and all parameters $s_{ij}$, $c_{ij}$, $K_{ij}$ and $L_{ij}$ of all branches in the power supply system; based on the convex functions; converting the formulas (13), (15) and (16) into the following formulas of: $g_{ij,n}(x)-f_{ij,n}(x)\le 0$, n=1, 2 (25), $g_{ij,3}(x)-f_{ij,3}(x)\le 0$ (26), $f_{ij,m}(x)-g_{ij,m}(x)\le 0$, m=1, 2, 3 (27), and $s_{ij}=\theta ij$ (28), the convex constraint comprises: the formulas (4), (5), (6), (7), (8), (9), (10), (11), (12), (13) and (25);

determining an initial value at iteration k=0, based on the first convex optimal model;

at iteration k, performing a linearization to the convex functions, so as to obtain a linear function, wherein the linear function is denoted as formulas of: $\hat{g}_{ij,m}(x,x^{(k)})=g_{ij,m}(x^{(k)})-\nabla g_{ij,m}(x^{(k)})^T(x-x^{(k)})$, m=1, 2, 3 (31) and $\hat{f}_{ij,3}(x,x^{(k)})=f_{ij,3}(x^{(k)})-\nabla f_{ij,3}(x^{(k)})^T(x-x^{(k)})$ (32), where, k denotes an iteration value;

establishing a second convex model of the optimal power flow according to the linear function, and setting a second constraint to the second convex model, wherein a target function of the second convex model is denoted by a formula of:

$$\min \sum C_i(p_i^g) + \tau^{(k)} \sum_{ij\in\Phi_i}\left(\sum_{m=1}^{3}\varepsilon_{ij,m}^{(k)} + \varepsilon_{ij,4}^{(k)}\right), \quad (33)$$

a second constraint of the second convex model comprises the formulas (4), (5), (6), (7), (8), (9), (10), (11), (12), (13), (25), (28) and formulas of: $f_{ij,m}(x)-\hat{g}_{ij,m}(x,x^{(k)})\le\varepsilon_{ij,m}^{(k)}$, m=1, 2, 3 (34), $g_{ij,3}(x)-\hat{f}_{ij,3}(x,x^{(k)})\le\varepsilon_{ij,4}^{(k)}$ (35), $\varepsilon_{ij,m}^{(k)}\ge 0$, m=1, ..., 3 (36), $\varepsilon_{ij,4}^{(k)}\ge 0$ (37), where $\varepsilon_{ij,m}^{(k)}$, m=1, 2, 3 denotes a first relaxation variant, a second relaxation variant and a third relaxation variant of the branch ij at k iteration, and $\varepsilon_{ij,4}^{(k)}$ denotes a fourth relaxation variant of the branch ij at k iteration; $\Phi_l$ denotes a set of all branches in the power supply system;

determining a relaxation variant sum e according to the second convex model; and judging whether the relaxation variant sum e is greater than a preset threshold;

if the relaxation variant sum e is greater than the preset threshold, adding the iteration value k by 1, and returning an act of performing the linearization to the convex functions, so as to obtain the linear function; and if the relaxation variant sum e is not greater than the preset threshold, determining a solution of the second convex optimal model of the optimal power flow of the power supply system as a feasible solution of the optimal model of the optimal power flow of the power supply system to obtain parameters of various control devices, and applying the parameters of various control devices to operation dispatching of the power supply system.

7. A non-transitory computer-readable storage medium, configured to store an application for performing:

acquiring an active power of a generator connected to each node from various control devices of the power supply system;

determining a target function of an optimal model of the optimal power flow according to the active power of the generator connected to each node, wherein the target function is denoted by a formula of $\min \Sigma C_i(p_i^g)$ (1)

where, i denotes a node in the power supply system, g denotes a generator in the power supply system, $p_i^g$ denotes an active power of the generator g connected with the node I, $C_i(p_i^g)$ is a convex function having a variant $p_i^g$ and denotes a generation cost of the generator g connected with the node i;

determining a first constraint of the optimal model of the optimal power flow, wherein the first constraint comprises at least one of: a branch power flow constraint of the power supply system, a node injection power balance constraint of the power supply system, a generator power constraint of the power supply system, a branch phase angle difference constraint of the power supply system, a branch power constraint of the power supply system and a node voltage amplitude constraint of the power supply system, in which, the branch power flow constraint is denoted by formulas of: $p_{ij}=G_{ij}V_i^2-G_{ij}V_iV_j\cos\theta_{ij}-B_{ij}V_iV_j\sin\theta_{ij}$ (2), $q_{ij}=-B_{ij}V_i^2+B_{ij}V_iV_j\cos\theta_{ij}-G_{ij}V_iV_j\sin\theta_{ij}$ (3), $\theta_{ij}=\theta_i-\theta_j$ (4), where, i and j denote adjacent nodes in the power supply system; $p_{ij}$ denotes a three-phase active power at a head of a branch in the power supply system; $q_{ij}$ denote a three-phase reactive power at the head of the branch ij; $V_i$ denotes a voltage amplitude of the node i; $V_j$ denotes a voltage amplitude of the node j; $\theta_i$ denotes a voltage phase angle of the node i; $\theta_j$ denotes a voltage phase angle of the node j; $\theta_{ij}$ denotes a difference between a voltage phase angle at the head of the branch ij and a voltage phase angle at the end of the branch ij; $G_{ij}$ denotes a conductance of the branch ij; and $B_{ij}$ denotes a susceptance of the branch ij;

the node injection power balance constraint is denoted by formulas of:

$$p_i^g - p_i^d = G_{sh,i}V_i^2 + \sum_{j\in\Phi(i)} p_{ij} \text{ and} \quad (5)$$

$$q_i^g - q_i^d = -B_{sh,i}V_i^2 + \sum_{j\in\Phi(i)} q_{ij}, \quad (6)$$

where, g denotes a generator in the power supply system; d denotes a load in the power supply system; sh denotes ground connection; $p_i^g$ denotes an active power of the generator g connected with the node i; $q_i^g$ denotes a reactive power of the generator g connected with the node i; $p_i^d$ denotes an active power of the load d connected with the node i; $q_i^d$ denotes a reactive power of the load d connected with the node i; $G_{sh,i}$ denotes a ground connection conductance of the node i; $B_{sh,i}$ denotes a ground connection susceptance of the node i; and Φ(i) denotes a node set consisted of nodes connected with the node i;

the generator power constraint is denoted by formulas of: $p_i^l \leq p_i^g \leq p_i^u$ (7) and $q_i^l \leq q_i^g \leq q_i^u$ (8), where, u denotes a upper limitation, l denotes a lower limitation; $p_i^l$ denotes a lower limitation of an active power of the generator g connected with the node i; $p_i^u$ denotes a upper limitation of an active power of the generator g connected with the node i; $q_i^l$ denotes a lower limitation of a reactive power of the generator g connected with the node i; $q_i^u$ denotes a upper limitation of a reactive power of the generator g connected with the node i;

the branch phase angle difference constraint is denoted by a formula of: $-\theta^u \leq \theta_{ij} \leq \theta^u$ (9), where, $\theta^u$ denotes a upper limitation of the difference between the voltage phase angle at the head of the branch ij and the voltage phase angle at the end of the branch ij;

the branch power constraint is denoted by a formula of: $p_{ij}^2 + q_{ij}^2 \leq (S^u)^2$ (10), where, $S^u$ denotes a upper limitation of an apparent power of respective branch in the power supply system;

the node voltage amplitude constraint is denoted by a formula of: $V^l \leq V_i \leq V^u$ (11), where, $V^l$ denotes a lower limitation of the voltage amplitude of respective node in the power supply system; $V^u$ denotes a upper limitation of the voltage amplitude of respective node in the power supply system;

converting the first constraint into a convex constraint based on convex functions so as to obtain a first convex optimal model, wherein the first convex optimal model comprises the target function and the first constraint, wherein the converting comprises: introducing a parameter $K_{ij}$ to place $V_i V_j \cos \theta_{ij}$, a parameter $L_{ij}$ to $V_i V_j \sin \theta_{ij}$, a parameter $U_i$ to place $V_i^2$, a parameter $s_{ij}$ to place $\sin \theta_{ij}$, and a parameter $c_{ij}$ to place $\cos \theta_{ij}$, to convert the branch power flow constraint into the following formulas of: $p_{ij} = G_{ij} U_i - G_{ij} K_{ij} - B_{ij} L_{ij}$ (12), $q_{ij} = B_{ij} U_i + B_{ij} K_{ij} - G_{ij} L_{ij}$ (13), $K_{ij}^2 + L_{ij}^2 = U_i U_j$ (14), $s_{ij} = \sin \theta_{ij}$ (15), $c_{ij} = \cos \theta_{ij}$ (16), $s_{ij}^2 + c_{ij}^2 = 1$ (17) and $s_{ij} K_{ij} = c_{ij} L_{ij}$ (18); defining the convex functions $f_{ij,1}(x)$, $f_{ij,2}(x)$, $f_{ij,3}(x)$, $g_{ij,1}(x)$, $g_{ij,2}(x)$ and $g_{ij,3}(x)$, wherein the convex functions are denoted by formulas of: $f_{ij,1}(x) = (U_i + U_j)^2$ (19), $f_{ij,2}(x) = 1$ (20), $f_{ij,3}(x) = (s_{ij} + K_{ij})^2 + (c_{ij} - L_{ij})^2$ (21), $g_{ij,1}(x) = (2K_{ij})^2 + (2L_{ij})^2 + (U_i - U_j)^2$ (22), $g_{ij,2}(x) = s_{ij}^2 + c_{ij}^2$ (23), $g_{ij,3}(x) = (s_{ij} - K_{ij})^2 + (c_{ij} + L_{ij})^2$ (24), where, x denotes a vector consisted of the parameter $U_i$ of all nodes and all parameters $s_{ij}$, $c_{ij}$, $K_{ij}$ and $L_{ij}$ of all branches in the power supply system; based on the convex functions; converting the formulas (13), (15) and (16) into the following formulas of: $g_{ij,n}(x) - f_{ij,n}(x) \leq 0$, n=1, 2 (25), $g_{ij,3}(x) - f_{ij,3}(x) \leq 0$ (26), $f_{ij,m}(x) - g_{ij,m}(x) \leq 0$, m=1, 2, 3 (27), and $s_{ij} = \theta ij$ (28), the convex constraint comprises: the formulas (4), (5), (6), (7), (8), (9), (10), (11), (12), (13) and (25);

determining an initial value at iteration k=0, based on the first convex optimal model;

at iteration k, performing a linearization to the convex functions, so as to obtain a linear function, wherein the linear function is denoted as formulas of: $\hat{g}_{ij,m}(x, x^{(k)}) = g_{ij,m}(x^{(k)}) - \nabla g_{ij,m}(x^{(k)})^T (x - x^{(k)})$, m=1, 2, 3 (31) and $\hat{f}_{ij,3}(x, x^{(k)}) = f_{ij,3}(x^{(k)}) - \nabla f_{ij,3}(x^{(k)})^T (x - x^{(k)})$ (32), where, k denotes an iteration value;

establishing a second convex model of the optimal power flow according to the linear function, and setting a second constraint to the second convex model, wherein a target function of the second convex model is denoted by a formula of:

$$\min \sum C_i(p_i^g) + \tau^{(k)} \sum_{ij \in \Phi_l} \left( \sum_{m=1}^{3} \varepsilon_{ij,m}^{(k)} + \varepsilon_{ij,4}^{(k)} \right), \quad (33)$$

a second constraint of the second convex model comprises the formulas (4), (5), (6), (7), (8), (9), (10), (11), (12), (13), (25), (28) and formulas of: $f_{ij,m}(x) - \hat{g}_{ij,m}(x, x^{(k)}) \leq \varepsilon_{ij,m}^{(k)}$, m=1, 2, 3 (34), $g_{ij,3}(x) - \hat{f}_{ij,3}(x, x^{(k)}) \leq \varepsilon_{ij,4}^{(k)}$ (35), $\varepsilon_{ij,m}^{(k)} \geq 0$, m=1, ..., 3 (36), $\varepsilon_{ij,4}^{(k)} \geq 0$ (37), where $\varepsilon_{ij,m}^{(k)}$, m=1, 2, 3 denotes a first relaxation variant, a second relaxation variant and a third relaxation variant of the branch ij at k iteration, and $\varepsilon_{ij,4}^{(k)}$ denotes a fourth relaxation variant of the branch ij at k iteration; $\Phi_l$ denotes a set of all branches in the power supply system;

determining a relaxation variant sum e according to the second convex model; and judging whether the relaxation variant sum e is greater than a preset threshold;

if the relaxation variant sum e is greater than the preset threshold, adding the iteration value k by 1, and returning an act of performing the linearization to the convex functions, so as to obtain the linear function; and if the relaxation variant sum e is not greater than the preset threshold, determining a solution of the second convex optimal model of the optimal power flow of the power supply system as a feasible solution of the optimal model of the optimal power flow of the power supply system to obtain parameters of various control devices, and applying the parameters of various control devices to operation dispatching of the power supply system.

* * * * *